United States Patent
Edme

(10) Patent No.: US 10,408,954 B2
(45) Date of Patent: Sep. 10, 2019

(54) SEISMIC SENSOR COUPLING

(71) Applicant: WESTERNGECO L.L.C., Houston, TX (US)

(72) Inventor: Pascal Edme, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 34 days.

(21) Appl. No.: 15/110,986

(22) PCT Filed: Jan. 16, 2015

(86) PCT No.: PCT/US2015/011742
§ 371 (c)(1),
(2) Date: Jul. 12, 2016

(87) PCT Pub. No.: WO2015/109175
PCT Pub. Date: Jul. 23, 2015

(65) Prior Publication Data
US 2016/0334523 A1 Nov. 17, 2016

Related U.S. Application Data

(60) Provisional application No. 61/928,652, filed on Jan. 17, 2014.

(51) Int. Cl.
*G01V 1/16* (2006.01)
*G01V 1/20* (2006.01)

(52) U.S. Cl.
CPC .............. *G01V 1/166* (2013.01); *G01V 1/20* (2013.01); *G01V 2210/1425* (2013.01)

(58) Field of Classification Search
CPC ... G01V 1/166; G01V 1/20; G01V 2210/1425
See application file for complete search history.

(56) References Cited

U.S. PATENT DOCUMENTS

| 2,705,314 A | 3/1955 | Gaby |
| 3,722,751 A | 3/1973 | Bisciglia |

(Continued)

FOREIGN PATENT DOCUMENTS

| EP | 0457644 B1 | 2/1994 |
| EP | 0736781 A1 | 10/1996 |

(Continued)

OTHER PUBLICATIONS

International Preliminary Report on Patentability issued in related PCT application PCT/US2015/011742 dated Jul. 28, 2016, 12 pages.

(Continued)

*Primary Examiner* — Krystine E Breier
(74) *Attorney, Agent, or Firm* — Kevin B. McGoff

(57) ABSTRACT

The present application relates to a seismic sensor coupling device and method. Translational data in a first direction is measured by particle motion sensors contained in an elongated housing of a sensor device provided at an earth surface. The particle motion sensors are spaced apart along a second, different direction along a longitudinal axis of the elongated housing. Rotation data around a third direction is computed based at least in part on computing a gradient of the translational data with respect to the second direction. Coupling of the sensor to the earth and features related thereto are addressed in the present application.

20 Claims, 5 Drawing Sheets

(56) References Cited

U.S. PATENT DOCUMENTS

| | | | |
|---|---|---|---|
| 3,930,218 A | 12/1975 | Hall, Jr. | |
| 3,934,218 A | 1/1976 | Bobb | |
| 4,134,097 A | 1/1979 | Cowles | |
| 4,163,206 A | 7/1979 | Hall, Jr. | |
| 4,300,220 A | 11/1981 | Goff et al. | |
| 4,334,296 A | 6/1982 | Hall, Jr. | |
| 4,520,467 A | 5/1985 | Berni | |
| 4,554,648 A | 11/1985 | Greer et al. | |
| 4,558,439 A | 12/1985 | Gudesen | |
| 4,599,713 A | 7/1986 | Rudaz | |
| 4,890,264 A | 12/1989 | Crews et al. | |
| 4,979,150 A | 12/1990 | Barr | |
| 4,996,675 A | 2/1991 | Beauducel | |
| 5,010,531 A | 4/1991 | McNeel | |
| 5,124,956 A * | 6/1992 | Rice | G01V 1/16 181/122 |
| 5,214,614 A | 5/1993 | Baule | |
| 5,365,491 A | 11/1994 | Sullivan et al. | |
| 5,555,530 A | 9/1996 | Meehan | |
| 5,621,699 A | 4/1997 | Rigsby et al. | |
| 5,648,938 A | 7/1997 | Jakubowicz | |
| 5,757,720 A | 5/1998 | Soubaras | |
| 5,890,264 A | 4/1999 | Shofner et al. | |
| 6,172,940 B1 * | 1/2001 | McConnell | G01H 3/12 181/122 |
| 6,288,976 B1 | 9/2001 | Ambs | |
| 6,301,195 B1 * | 10/2001 | Faber | G01V 1/181 367/188 |
| 6,314,371 B1 | 11/2001 | Monk | |
| 6,330,512 B1 | 12/2001 | Thomas et al. | |
| 6,335,577 B1 | 3/2002 | Orban et al. | |
| 6,353,577 B1 | 3/2002 | Orban et al. | |
| 6,381,544 B1 | 4/2002 | Sallas et al. | |
| 6,442,304 B1 | 8/2002 | Crawley et al. | |
| 6,446,009 B1 | 9/2002 | Baeten et al. | |
| 6,584,038 B2 | 6/2003 | Meunier | |
| 6,607,050 B2 | 8/2003 | He et al. | |
| 6,712,141 B1 | 3/2004 | Bussear et al. | |
| 6,791,901 B1 | 9/2004 | Robertsson et al. | |
| 6,814,160 B1 * | 11/2004 | Scott | G01V 1/16 175/19 |
| 6,814,179 B2 * | 11/2004 | Corrigan | G01V 1/16 181/104 |
| 6,868,356 B2 | 3/2005 | Nai et al. | |
| 6,894,948 B2 | 5/2005 | Brittan et al. | |
| 6,932,185 B2 | 8/2005 | Bary et al. | |
| 6,961,283 B2 | 11/2005 | Kappius et al. | |
| 7,082,079 B2 | 7/2006 | Woo | |
| 7,142,481 B1 | 11/2006 | Metzbower et al. | |
| 7,252,174 B2 | 8/2007 | Cox et al. | |
| 7,286,938 B2 | 10/2007 | Amundsen et al. | |
| 7,474,591 B2 | 1/2009 | Menard et al. | |
| 7,520,467 B2 | 4/2009 | Cilffre et al. | |
| 7,551,517 B2 | 6/2009 | Berg et al. | |
| 7,616,114 B2 * | 11/2009 | Tonelli | G01V 1/186 340/545.4 |
| 7,656,746 B2 | 2/2010 | De Kok et al. | |
| 7,710,822 B2 | 5/2010 | Harmon | |
| 7,916,576 B2 | 3/2011 | Beasley et al. | |
| 8,199,611 B2 | 6/2012 | Goujon | |
| 8,520,469 B2 | 8/2013 | Ronnow et al. | |
| 8,654,606 B2 | 2/2014 | Muyzert et al. | |
| 8,665,671 B2 | 3/2014 | Muyzert et al. | |
| 8,712,694 B2 | 4/2014 | Edme et al. | |
| 8,755,643 B2 | 6/2014 | Nash et al. | |
| 9,103,930 B2 | 8/2015 | Paulson et al. | |
| 9,110,187 B2 | 8/2015 | Muyzert et al. | |
| 9,151,857 B2 * | 10/2015 | Manin | G01V 1/38 |
| 9,594,174 B2 | 3/2017 | Goujon et al. | |
| 9,841,519 B2 * | 12/2017 | Rouquette | G01V 1/201 |
| 2004/0257913 A1 | 12/2004 | Ray et al. | |
| 2005/0034917 A1 | 2/2005 | Mathiszik et al. | |
| 2007/0056795 A1 | 3/2007 | Cox et al. | |
| 2007/0104028 A1 | 5/2007 | Van Manen et al. | |
| 2007/0265786 A1 | 11/2007 | Ozdemir et al. | |
| 2008/0037369 A1 | 2/2008 | Hentati | |
| 2008/0049551 A1 | 2/2008 | Muyzert et al. | |
| 2008/0225641 A1 | 9/2008 | Van Manen et al. | |
| 2009/0012711 A1 | 1/2009 | Harmon | |
| 2009/0052277 A1 | 2/2009 | Swanson | |
| 2009/0296529 A1 | 12/2009 | Boergen et al. | |
| 2010/0100330 A1 | 4/2010 | Burkholder et al. | |
| 2010/0195438 A1 | 8/2010 | Goujon | |
| 2010/0195439 A1 | 8/2010 | Muyzert | |
| 2010/0202251 A1 | 8/2010 | Ozdemir et al. | |
| 2010/0225324 A1 | 9/2010 | Strack et al. | |
| 2010/0265797 A1 | 10/2010 | Robertsson et al. | |
| 2010/0286922 A1 | 11/2010 | Poletto | |
| 2010/0302909 A1 | 12/2010 | Muyzert et al. | |
| 2011/0061454 A1 | 3/2011 | Vornbrock et al. | |
| 2011/0080808 A1 | 4/2011 | Muyzert et al. | |
| 2011/0082646 A1 | 4/2011 | Halliday et al. | |
| 2011/0082647 A1 | 4/2011 | Edme et al. | |
| 2011/0085417 A1 | 4/2011 | Ronnow | |
| 2011/0085419 A1 | 4/2011 | Ronnow et al. | |
| 2011/0141849 A1 | 6/2011 | Brittan | |
| 2011/0242933 A1 | 10/2011 | Maissant et al. | |
| 2011/0249530 A1 | 10/2011 | Liu et al. | |
| 2012/0026834 A1 | 2/2012 | Muyzert et al. | |
| 2012/0035852 A1 | 2/2012 | Edme | |
| 2012/0081999 A1 | 4/2012 | Halliday et al. | |
| 2012/0113749 A1 | 5/2012 | Edme et al. | |
| 2012/0137781 A1 | 6/2012 | Hill et al. | |
| 2012/0250460 A1 | 10/2012 | Edme et al. | |
| 2012/0253680 A1 | 10/2012 | Thompson et al. | |
| 2012/0253683 A1 | 10/2012 | Edme et al. | |
| 2012/0269033 A1 | 10/2012 | Maples et al. | |
| 2013/0272091 A1 | 10/2013 | Yilmaz | |
| 2013/0315036 A1 | 11/2013 | Paulson et al. | |
| 2014/0022861 A1 | 1/2014 | Edme et al. | |
| 2014/0219053 A1 * | 8/2014 | Goujon | G01V 1/162 367/38 |
| 2014/0219055 A1 | 8/2014 | Goujon et al. | |
| 2016/0025875 A1 | 1/2016 | Friedly et al. | |
| 2017/0212259 A1 * | 7/2017 | Degner | G01V 1/166 |
| 2017/0350996 A1 * | 12/2017 | Andersen | G01V 1/047 |

FOREIGN PATENT DOCUMENTS

| | | | |
|---|---|---|---|
| EP | 0932843 B1 | 2/2005 | |
| EP | 1257849 B1 | 1/2009 | |
| EP | 1454169 B1 | 11/2013 | |
| EP | 2293116 B1 | 7/2014 | |
| FR | 2738642 A1 | 7/1997 | |
| GB | 1256304 | 12/1971 | |
| GB | 2456313 B | 5/2010 | |
| KR | 20110042276 A | 4/2011 | |
| RU | 32290 U1 | 9/2003 | |
| WO | WO-9219991 A1 * | 11/1992 | G01V 1/16 |
| WO | 2001/59482 A1 | 8/2001 | |
| WO | 2003/036331 A1 | 5/2003 | |
| WO | 2005/017563 A1 | 2/2005 | |
| WO | 2010/048906 A2 | 5/2010 | |
| WO | 2010/090949 A2 | 8/2010 | |
| WO | 2012/015520 A1 | 2/2012 | |
| WO | 2013/090544 A1 | 6/2013 | |
| WO | 2013/150452 A1 | 10/2013 | |

OTHER PUBLICATIONS

Office Action No. 67990 issued in cross referenced MX application MX/a/2015/008000 dated Aug. 26, 2016, 7 pages.
Office Action issued in cross referenced RU application 2015131023 dated Apr. 19, 2016, 16 pages.
Decision on Grant issued in cross referenced RU application 2015131023 on Jul. 21, 2016, 23 pages.
Communication issued in cross referenced EP Application No. 14746018.2 dated Feb. 17, 2016, 7 pages.
Extended EP Search Report issued in cross referenced EP Application No. 15177756.2 dated Jan. 5, 2016, 7 pages.
Supplementary EP Search Report issued in cross referenced EP Application No. 14746018.2 dated Jan. 18, 2016, 3 pages.

(56) References Cited

OTHER PUBLICATIONS

Barr, F.J., "Dual-Sensor OBC Technology," The Leading Edge, Jan. 1997. vol. 16(1).
Barr, et al., "Attenuation of Water-col. Reverberations Using Pressure and Velocity Detectors in Water-Bottom Cable," SEG Annual International, Oct. 1989.
Criss, "Another look at full-wave seismic imaging," First Break, Jun. 2007. vol. 25.
Curtis, et al, "Seismic interferometry—turning noise into signal," The Leading Edge, Sep. 2006.
De Meersman, et al., "A Complex SVD-Polaraization Filger for Ground Roll Attenuation on Multi-Component Data," EAGE 67th Conference and Exhibition, Jun. 2005.
Dey, et al., "Noise suppression on Geophone data using microphone measurements," Crewes Research Report, 2000. vol. 12.
Drijkoningen, "Design of Seismic Network in LOFAR: Testing at Exloo Test-Site," Jul. 2007.
Drijkoningen, et al., "Project Plan of the Seismic Application in LOFAR,"Sep. 2007.
Edme, et al., "Receiver Function Method in Reflection Seismology," Geophysical Journal International, 2008.
Edme, et al, "Receiver Function Decomposition of OBC Data: Theory," Geophysical Journal International, 2009. vol. 177(3).
Greensted, "The Lab Book Pages: Delay Sum Beamforming an online collection of electronics information," Ghe Lab Book Pages, Oct. 2012 retrieved at http://www.labbookpages.co.uk/audio/beamforming/delaySum.html on Feb. 7, 2017.
Halliday, et al., "Interometric surface-wave isolation and removal," Geophysics, Sep.-Oct. 2007. vol. 72(5).
Digital Sensors, ION Geophysical 2009 retrieved on Mar. 17, 2010 at http://www.iongeo.com/Land_Imaging/Digital_Sensors/.
Sensor Geophones, ION Geophysical 2009 retrieved on Mar. 17, 2010 at http://www.iongeo.com/Land_Imaging/Geophones/.
Karsli, et al., "Using the Wienner-Levison Algorithm to Supress Ground Roll," Journal of Applied Geophysics, Mar. 2004. vol. 55(3-4).
Kragh, et al., "Ground Roll and Polarization," First Break, Sep. 1995. vol. 13(9).
Robertsson, et al., "Wavefield Separation using Densely Deployed Three-Component Single-Sensor Groups in Land Surface-Seismic Recordings," Geophysics, Sep. 2002 vol. 67(5).

Snieder, "Extracting the Green's function of attenuating heterogeneous acoustic media from uncorrelated waves," J. Acoust. Soc. Am. May 2007. vol. 121(5).
Snieder, et al., "Cancellation of spurious arrivals in Green's function extraction and the generalized optical theorem," Physical Review E. 2008. vol. 78.
Van Dalen, et al., "G035: Characterization of Subsurface Parameters with Combined Fluid-Pressure and Particle-Velocity Measurements," 70th EAGE Conference & Exhibition, Jun. 9, 2008.
Kennett, "Seismic wave propagation in stratified media," Cambridge Universion Press, 1983.
Sercel Broushure, "428XL Land Seismic Acquisition System," pp. 1-12, retrieved at http://www.sercel.com/products/Pages/428xl.aspx on Feb. 7, 2017.
Pham, et al., "Investigation of ground rotational motions caused by direct and scattered P-waves from the Mar. 4, 2008 TAIGER explosion experiment," Journal of Seismology, Kluwer Academic Publishers, vol. 16, No. 4.
Examination Report for the cross referenced Australian patent application 2014212354 dated May 2, 2017.
Office Action for the cross referenced GCC patent application of GC 2014-26355 dated Jun. 3, 2017.
International Search Report and Written Opinion for the cross referenced International patent application PCT/US2014/013866 dated May 8, 2014.
International Search Report and Written Opinion for the cross referenced International patent application PCT/US2014/051971 dated Dec. 11, 2014.
Office Action for the cross referenced GCC patent application GC2014-27799 dated Oct. 9, 2017.
International Search Report and Written Opinion of International Patent Application No. PCT/US2015/011742 dated Apr. 10, 2015, 15 pages.
Office Action Issued in cross referenced CN application 201480007162.6 dated Oct. 10, 2016 (31 pages).
Office Action Issued in cross referenced CN application 201480007162.6 dated Jul. 10, 2017 (8 pages).
International Preliminary Report on patentability for the cross referenced International patent application PCT/US2014/013866 dated Aug. 04, 2015 (9 pages).
International Preliminary Report on Patentability for the cross referenced International patent application PCT/US2014/051971 dated Feb. 23, 2016 (5 pages).

* cited by examiner

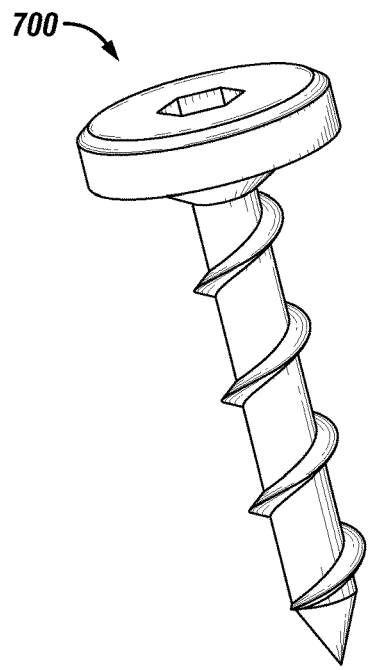
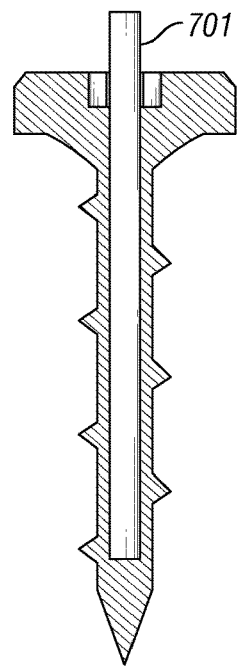
FIG. 7A  FIG. 7B
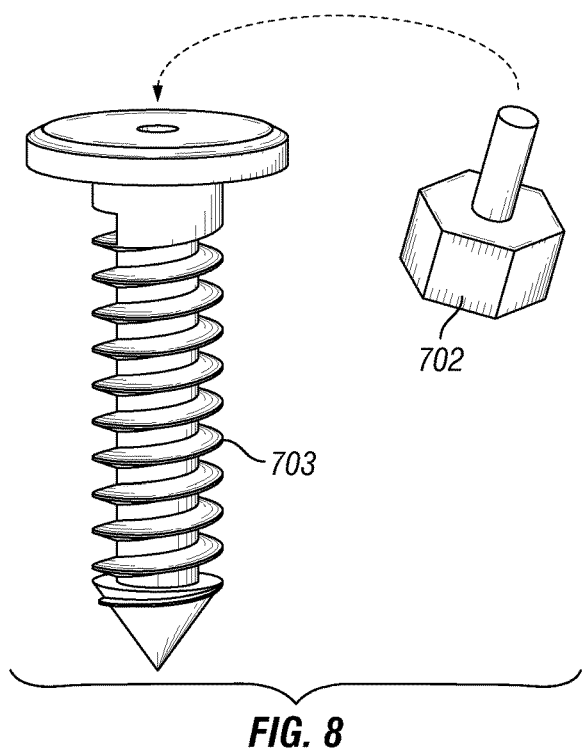
FIG. 8

SEISMIC SENSOR COUPLING

CROSS REFERENCE TO RELATED APPLICATIONS

This application claims priority to and incorporates by reference U.S. application Ser. No. 61/928,652 that was filed on Jan. 17, 2014, the entirety of which is incorporated herein by reference.

BACKGROUND

Seismic surveying is used for identifying subterranean elements of interest, such as hydrocarbon reservoirs, freshwater aquifers, gas injection zones, and/or the like. In seismic surveying, seismic sources are activated to generate seismic waves directed into a subterranean structure.

The seismic waves generated by a seismic source travel into the subterranean structure, with a portion of the generated seismic waves reflected back to the surface where the reflected waves are received by seismic sensors (e.g. geophones, accelerometers and/or the like). The seismic sensors produce signals that represent detected seismic waves. Signals from the seismic sensors are processed to yield information about the content and characteristics and/or images of the subterranean structure.

A land-based seismic survey arrangement may include a deployment of an array of seismic sensors at a land-air interface, in a borehole and/or the like. A marine survey arrangement may include placing a seabed cable or other arrangement of seismic sensors on the seafloor.

The seismic waves can be recorded with various types of seismic sensors (geophones, accelerometers, MEMS, rotational sensors, gradient sensors, divergence sensors, hydrophones). The term "sensor" as used herein is intended to cover all devices that are used to detect signals transmitted through the ground in methods of seismic exploration. The "Sensor" therefore includes multi-component sensors that may comprise a plurality of hydrophones, geophones, accelerometers and/or the like.

Different sensors are sensitive to different parts of the seismic wavefield. The data can be locally stored (nodal based system) or sent to a recording station (cable based system). This data is then processed to obtain sub-surface information. High fidelity measurement is required to provide accurate information.

Land operations can include measuring the seismic wavefield on-shore, by deploying at least some of the seismic sensors at or just below the surface. As such, for effective seismic-land-surveys, the sensors need to be effectively coupled with the land/soil/earth formation to provide for the sensors receiving/recording reliable/accurate seismic data. Various embodiments described herein address various issues related thereto.

From herein, the terms "land" and "soil" may refer to a variety of materials in which (or on which) the sensors are deployed in a land-based seismic survey. "Land" or "Soil" therefore includes any type of surface condition, e.g. dirt, sand, hardpan, rock, concrete, mud, submerged sediments and/or the like.

SUMMARY

The following summary of various combinations of features is meant to help the understanding of one skilled in the art, and is not meant in any way to unduly limited any present or future related claims.

According to various embodiments, the present application relates to a method of seismic surveying including, placing at least partially into an earth surface, a seismic sensor coupling device that has a screw shape that when rotated digs into the earth, by rotating the coupling device; placing a seismic sensor system into the coupling device so that the seismic sensor is coupled to the coupling device so as to receive seismic signals reverberating through the earth subsurface; actuating a seismic source to transmit impulses into the earth subsurface; receiving, by the seismic sensor system, translational data in a first direction measured by particle motion sensors contained in an elongated housing of a seismic sensor device provided proximate the earth surface, the particle motion sensors spaced apart along a second, different direction along a longitudinal axis of the elongated housing, and receiving translational data in a third direction measured by additional particle motion sensors in the housing, the translational data in the first and third directions corresponding at least partially to the impulses; and recording the translational data in the first direction and the translational data in the third direction, wherein a gradient of the translational data in the first direction with respect to the second direction is useable to compute rotation data around the third direction, and wherein a gradient of the translational data in the third direction with respect to the second direction is useable to compute rotation data around the first direction.

According to various embodiments, aspects of the present application relate to a seismic sensor device having, a sensor comprising an elongated housing having a longitudinal axis and one end that is adapted to be input into an earth to form a connection between the earth and the elongated housing so that seismic signals transmitted though the earth, including ground roll, will be transmitted to the elongated housing; particle motion sensors within the elongated housing, a first of the particle motion sensors to measure translational data along three orthogonal axes and a second of the particle motion sensors to measure translational data along at least two orthogonal axes, the particle motion sensors configured so that the particle motion sensors are co-axial along one of the three axes and spaced apart from one another along the co-axial axis; and a sensor coupling device that comprises a screw thread that when rotated digs and promotes the entrance of the coupling into earth, and has an inner compartment that is adapted to an contains the sensor so that when in the earth the sensor is coupled to the earth by way of the coupling device so as to receive seismic signals that travel through the earth.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

Some embodiments are described with respect to the following figures.

FIGS. 7A-B illustrate a coupling device comprising a drill bit for deploying the coupling device, in accordance with one embodiment of the present disclosure.

FIG. 8 illustrates a coupling device comprising a screw-thread for deploying the coupling device, in accordance with one embodiment of the present disclosure.

Figure 1:
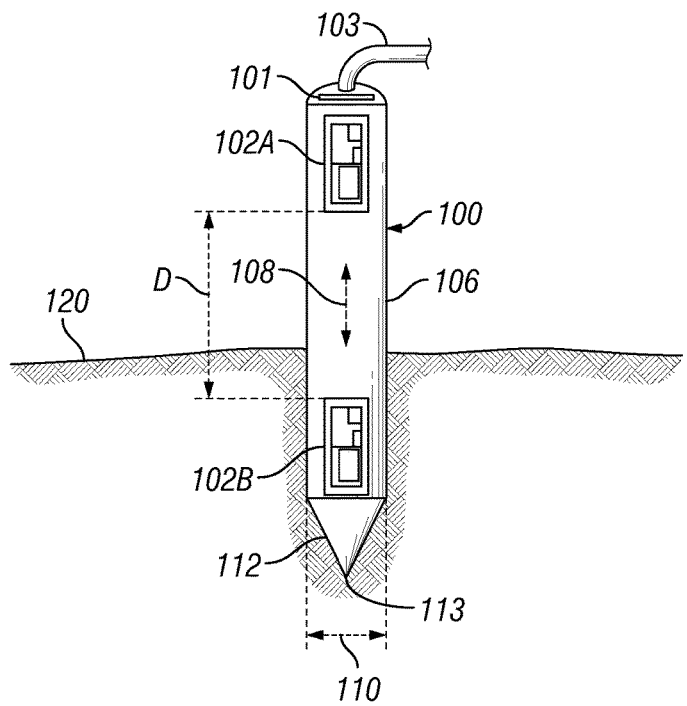
FIG. 1 is a schematic diagram of a sensor device that may be used with the sensor coupling system according to some implementations of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In seismic surveying (marine or land-based seismic surveying), seismic sensors are used to measure seismic data, such as displacement, velocity, or acceleration. Seismic sensors can include geophones, accelerometers, microelectromechanical systems (MEMS) sensors, or any other type of sensors that measure translational motion of the surface in one or more directions. In the ensuing discussion, a seismic sensor that measures translational motion is referred to as a particle motion sensor. A particle motion sensor can refer to any of the sensors listed above.

An arrangement of particle motion sensors can be provided at (or proximate) a ground surface or earth surface (land surface or bottom surface of a body of water, such as a seafloor) to measure seismic waves reflected from a subterranean structure, in response to seismic waves (or impulses) produced by one or more seismic sources and propagated into an earth subsurface. A particle motion sensor provided at a ground surface can refer to a particle motion sensor that is placed in contact with the ground surface, partially buried in the ground surface, or completely buried in the ground surface up to a predetermined depth (e.g. up to a depth of less than 5 meters). A particle motion sensor at (or proximate) the earth surface can record the vectorial part of an elastic wavefield just below the free surface (i.e. ground surface).

In addition to measuring translational data, it may be useful to obtain rotation data when performing survey data acquisition for various purposes. For example, rotation data can be combined with translational data measured by particle motion sensors to eliminate or attenuate noise from the measured translational data. Examples of noise include ground-roll noise or another type of noise (such as ambient noise) that can travel along the earth's surface. Ground-roll noise can be produced by a seismic source or other source, such as cars, engines, pumps, and natural phenomena such as wind and ocean waves. The ground-roll noise travels generally horizontally along an earth surface towards seismic receivers. The horizontally traveling seismic waves, such as Rayleigh waves or Love waves, are undesirable components that can contaminate seismic survey data.

Although reference is made to using rotation data to attenuate noise, it is noted that rotation data can be used for other purposes, whether in the context of a land-based survey acquisition or marine-based survey acquisition in which a seabed cable or other arrangement of seismic sensors is placed on the seafloor. For example, rotation data and translational data can be used in performing various seismic data processing algorithms, including, among others, wavefield interpolation, wavefield extrapolation, wavefield reconstruction, wavefield regularization, P- and S-wave separation, apparent velocity estimation, near-surface characterization, seismic sensor calibration, and seismic imaging.

Wavefield interpolation refers to estimating (interpolating) wavefields at locations where seismic sensors are not provided. P- and S-wave separation refers to separating compressional (P) waves from shear (S) waves in measured seismic survey data. Apparent velocity estimation refers to estimating a characteristic of the seismic wavefield known as ray parameter or horizontal slowness, from which seismic wave velocities at various points in a subterranean structure can be retrieved. Near-surface characterization refers to estimating the shallow earth elastic properties. Seismic sensor calibration refers to calibrating a seismic sensor to compensate for any non-ideal characteristic of the seismic sensor.

Rotation data refers to a rate of rotation (or change in rotation over time) about a specific axis, such as about the x axis (which can also be referred to as a horizontal inline axis) and/or about the y axis (which can also be referred to as a horizontal crossline axis). In accordance with some implementations, rotation data can be derived based on translational data measured by particle motion sensors. In this way, a separate rotational sensor would not have to be provided in survey equipment for the purpose of measuring rotation data.

FIG. 1 depicts an example seismic sensor device 100 that includes a first sensor component 102A and a second sensor component 102B. The sensor components 102A and 102B are included inside a single housing 106 of the sensor device 100. The seismic sensor device 100 can also include a power source, such as a battery, a solar cell, and so forth. In manufacturing the seismic sensor device 100, the housing 106 can be sealed to protect the sensor components 102A and 102B.

The housing 106 generally has an elongated shape that allows the sensor components 102A and 102B to be spaced apart along a longitudinal axis 108, by a distance D, of the sensor device 100. In some implementations, the sensor components 102A and 102B are co-axial along the longitudinal axis of the housing 106. The elongated housing 106 can be in the form of a hollow tube, stick, or other elongated structure. The longitudinal axis 108 is the axis along a dimension of the sensor device 100 which is longer than other dimensions of the sensor device 100, such as a width dimension 110 or a depth dimension (not shown) that corresponds to a thickness of the housing 106.

The sensor device 100 having the elongated housing 106 can be referred to as a spike-shaped sensor device.

The housing 106 can be made out of a material, such as plastic, metal, and so forth. According to an example embodiment, the housing 106 may not resonate within a bandwidth of interest for target signals to be measured. In some examples, the bandwidth of interest can be in the range between 1 to 250 Hertz (Hz). In other examples, the housing 106 may exhibit resonance; in such examples, the resonance can be removed by processing, or the resonance can be compensated for by processing.

By arranging the sensor components 102A and 102B in the elongated housing 106 as shown in FIG. 1, the sensor components 102A and 102B are spaced apart along just the longitudinal axis 108. In other words, in some implementations, the sensor device 100 does not include sensor components that are spaced apart in any other direction (other than a direction parallel to the longitudinal axis).

FIG. 1A shows a portion of the sensor device 100 (not to scale) being below the ground surface 120, and a portion of the sensor device 100 being above the ground surface 120. According to an embodiment, the configuration can include a sensor 102B below the ground surface and a sensor 102A above the ground surface. A sensor can also be positioned at or proximate the ground surface 120. According to an embodiment, a majority of the sensor device 100 can be below the ground surface 120. According to another embodiment a majority of the sensor device 100 can be above the ground surface 120. Another embodiment can have approximately half the sensor device 100 above and half the sensor device 100 below the ground surface 120.

In some examples, to obtain rotation data with respect to a horizontal axis at a ground surface 120, two vertically spaced horizontal orientated particle motion sensors can be provided in the sensor device 100. The sensor device 100 can then be vertically arranged at or near the ground surface 120. It should be understood that additional sensors to 102A and 102B can be located along the length of the sensor device 100 to provide redundancy for failed sensors and/or additional measurements.

The sensor device 100 can include a communication interface circuit 101, which is connected to a communications medium 103 (e.g. electrical cable, fiber optic cable, etc.). The communications medium 103 can be a wireless medium over which data can be communicated. The communication interface circuit 101 is connected to the sensor components 102A and 102B. Data acquired by the sensor components 102A and 102B are transferred to the communication interface circuit 101, which in turn transmits the acquired data over the communications medium 103 to a remote station, which can be a recording station, a computer, and so forth. According to other embodiments, a memory can be provided and incorporated with the sensor device 100. The memory can also be separate from the sensor device 100 and connected by wire, or short range wireless technology such as Wi-Fi or Bluetooth. An arrangement where memory is included can be referred to in the commercial art as a "blind" node arrangement. In this "blind" node arrangement, a communications interface circuit 101 may not have to be present. It should also be appreciated that a combination of a "blind" node arrangement and a wired node and a wireless node arrangement can be used.

In further implementations, the sensor device 100 may contain a sensing element (or sensing elements) to measure a tilt and/or an azimuth of the sensor device 100, where tilt is measured with respect to the z axis. This sensing element(s) can be part of the sensor components 102A and 102B that measure translation and rotation. For example, if the sensor components 102A and 102B include MEMS accelerometers that measure down to DC, then the MEMS accelerometers can provide tilt data. If the sensor components 102A and 102B include geophones, then a tilt meter can be added. An azimuth sensor (e.g. magnetometer, compass) can be added, so that measured horizontal components (e.g. translational data or rotation data in the x or y axis) can be rotated with respect to a global reference. If an azimuth sensor is not provided, then the sensor device 100 can be oriented azimuthally to a predefined azimuth when the sensor device 100 is planted.

Also, control circuitry (not shown) can be included in the sensor device 100 to control the particle motion sensors. Additionally, an analog-to-digital converter and other components may be included, such as in the communication interface circuit 101, to convert signals measured by the particle motions sensors into digital form. The components in the sensor device 100 may be powered by a battery, a solar panel, or through a wired or wireless connection.

The bottom portion of the sensor device 100 may include a spike 112 for driving the sensor device 100 into the ground surface 120. The spike 112 has a generally sharp tip 113 that allows for easier insertion of the sensor device 100 into the ground surface 120 to form a connection between the earth and the sensor device 100. A user or machine can push the spike 112 into the ground surface 120 to cause at least a portion of the sensor device 100 to be buried in the earth beneath the ground surface 120. For example, the sensor device 100 can be driven into the ground surface using a hammer, either by a user or in an automated manner by a machine. In different examples, the sensor device 100 can be screwed into the ground by a wrench or planted in a prepared borehole with reduced disturbance of the surrounding earth. As another example, a borehole may be dug and the sensor device 100 may be placed therein. The borehole may be refilled after positioning the sensor device 100. Instead of using the spike 112, the housing 106 of the sensor device 100 can have a V or screw shape to facilitate planting into the ground surface 120 (protrusions can be formed on the outer wall of the housing 106 in the form of a helical screw).

In some cases, the sensor device 100 is partially buried beneath the ground surface 120, with a portion of the sensor device 100 protruding above the ground surface 120. In other cases, the sensor device 100 can be completely buried in the ground surface, up to a predetermined depth (as discussed above).

In some examples, the sensor components 102A and 102B are sensor chips. A sensor chip refers to an integrated circuit device that includes a substrate (e.g. semiconductor substrate) on which particle motion sensors can be provided. For example, the particle motion sensors that can be provided in the sensor chip 102A or 102B can include MEMS particle motion sensors, such as MEMS accelerometers. A MEMS particle motion sensor can include a micro element (e.g. a micro cantilever) that is moveable in response to particle motion, where the movement of the micro element can be detected by a sensing element. In other examples, the sensor components 102A and 102B can include other types of particle motion sensors.

Figure 2A:
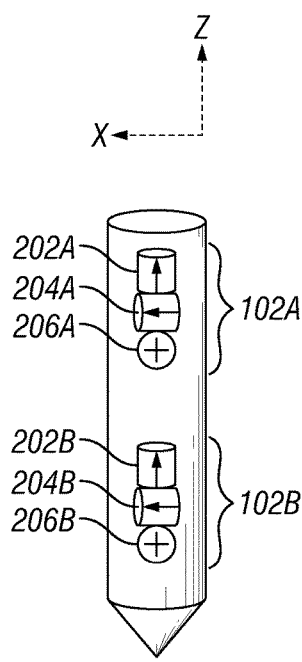
FIGS. 2A-2C are schematic diagrams of a sensor device that may be used with the sensor coupling system according to some implementations of the present disclosure.
Figure 2B:
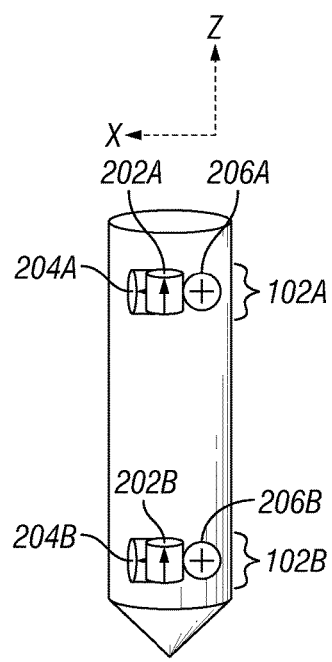

In some implementations, the particle motion sensors that are provided in the sensor component 102A or 102B can measure translational data in multiple directions, such as the x, y and z directions. Examples of such arrangements are shown in FIGS. 2A and 2B, where the sensor component 102A or 102B includes a respective z sensor 202A or 202B (for measuring translational data along the z axis), a respective x sensor 204A or 204B (for measuring translational data along the x axis), and a respective y sensor 206A or 206B (for measuring translational data along the y axis).

Figure 2C:
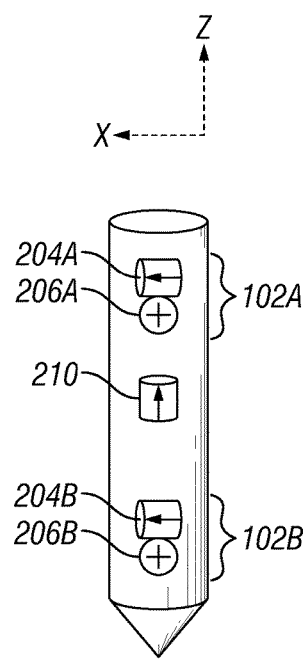

In further examples, such as shown in FIG. 2C, the sensor component 102A or 102B can include just a respective x sensor 204A or 204B and a respective y sensor 206A or 206B. In the arrangement of FIG. 2C, a separate z sensor 210 can be provided for measuring translational data along the z direction. The z sensor 210 can be positioned in the middle between sensor components 102A and 102B. In other examples, the z sensor 210 can be positioned elsewhere, such as in either 102A or 102B. In some implementations, a pair of sensors (e.g. 204A and 204B, or 206A and 206B, or 202A and 202B) can be hardwired together to provide the sum and the difference as outputs. The sum can help reduce the non-correlated noise (between the elements of a pair) and the difference provides a gradient.

In other implementations, the sensor component 102A can include particle motion sensors to measure in the x, y, and z axes, while the sensor component 102B can include particle motion sensors to measure in just the x and y axes.

Note that the particle motion sensors in a given component (e.g. 102A) within the same sensor device 100 do not have to be orientated in the same direction as the other sensor component (e.g. 102B). If the relative angle between the sensor components 102A and 102B is known, then the measured data by the pair of particle motion sensors can be corrected using vector rotation.

Figure 3:
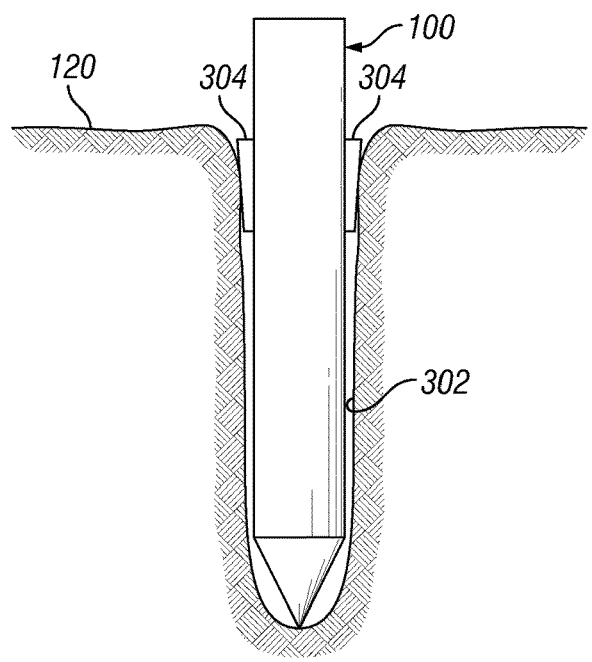
FIG. 3 is a schematic diagram of a sensor device partially buried in a hole, without a sensor coupling system, according to some implementations.

As shown in FIG. 3, in previous implementations, a driving action was applied to the sensor device 100 (e.g. repeated hammer impacts on the sensor device 100) to drive the sensor device 100 into a hole 302 extending from the ground surface 120. The driving action on the sensor device 100 may have caused the hole 302 to widen near the earth surface 302. The widening of the hole 302 near the earth surface 300 may cause resonances in the sensor device 100 that may be observed in measured seismic survey data.

Figure 4:
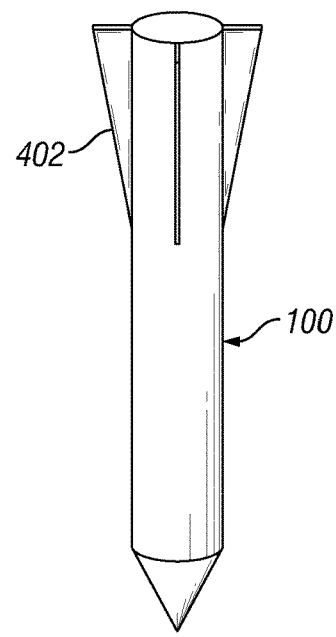
FIG. 4 is a schematic diagram of a sensor device according to further implementations that may be used with the sensor coupling system of the present disclosure according to some implementations of the present disclosure.

In other previous system, as shown in FIG. 4, the sensor device 100 may be provided with wings or fins 402 (e.g. vertical fins), to allow the upper portion of the sensor device 100 to be more effectively coupled to the surrounding earth when the sensor device 100 is driven into the hole 302 (FIG. 3). In other previous systems, a hole was dug and the sensor device 100 positioned in the hole, and then the hole was backfilled to provide good coupling; improved coupling with respect to the previous example in which the sensor was "hammered into the ground."

As can be seen from the descriptions of previous methods of deploying sensors for a land seismic survey, there may be issues with effectively coupling the sensors to the soil. Additionally, inefficient/ineffective methods such as manually backfilling holes after sensor insertion, positioning material in the hole to provide for coupling or using wings on the top of the sensor device.

Embodiments of the present disclosure relate to a system and method to provide coupling between a seismic sensor(s) and the soil. More particularly, but not by way of limitation, in some implementations, systems and methods are provided for coupling a divergence/rotation sensor to the soil, where the performance of such sensors is related to effective coupling with the soil. In some implementations, the coupling systems may be used in an automated/semi-automated system for land sensor deployment.

Implementations of the present disclosure relate to an apparatus and method to facilitate the deployment of a seismic sensor by using a dedicated coupling device. The sensor is engaged, clamped to or slide inside of the coupling device. The coupling device may be used with a divergence/rotation sensor where the sensors comprise relatively long/tall sensors that may be hard to deploy into land. In other implementations the coupling device may be used as part of an automated deployment system. In aspects of the present disclosure, the sensor may be clamped to the coupling device, in other aspects the fit between the sensor and the coupling device may configured to provide minimal or even no movement of the sensor device when housed in the coupling device.

In deployment of seismic sensors for a land survey, often a significant force needs to be applied for the sensor to penetrate into the soil. This may cause issue in term of sensor design robustness. Additionally, when sensors are deployed by placing on the land surface or being driven into the soil by means of a "spike", the coupling between the sensor and the soil may be poor; soil properties may provide for non-uniform/poor coupling even spike-type deployment. In order to reduce the required force and to facilitate penetration and good coupling, an alternative approach would be to screw the sensor into the ground, using screw shaped sensors, however, this has not previously been contemplated, because among other things, the presence of wires attached to the sensor may be damaged by such screwing.

In an embodiment of the present disclosure, a dedicated coupling device is proposed, to which the actual sensor may be engaged with a perfect coupling. In one embodiment, the coupling device is planted in/coupled with the soil and the sensor is then engaged/coupled with the coupling device. Merely by way of example, the coupling device may be described as a holder, a plug and/or the like connecting the sensor with the ground. The coupling device comprises an outer-design (external shape) and an inner-design (internal shape).

In certain aspects, the inner design may depend on the actual sensor shape. For example, the inner-design may exactly fit the actual sensor shape to warranty a perfect coupling between the sensor and the coupling device. The inner-design may comprise a smooth surface so that the sensor may slide into the coupling device. In some aspects, a locking mechanism or a ridge on the inner-design may provide for confirmation of coupling between the sensor and the coupling device. In other aspects, a monitor or the like may confirm/report/transmit that the sensor and the coupling device are properly coupled. In some embodiments, the latches, grooves and/or the like may be provided on the inner-design or the surface of the sensor to improve/secure this coupling. Grooves/holes or the like in the inner-design and/or a reservoir in the coupling device may provide for transmission of air out of the coupling device when the sensor is deployed within the coupling device.

The outer design and/or the material the coupling device may be varied depending on the soil conditions and on the method used for deploying the coupling device. In some aspects, different coupling devices may be used for different soil conditions providing a customizable sensor deployment system. In some aspects, the coupling device may comprise sensors that may determine the state of coupling between the sensor and the coupling device, the orientation/tilt/location of the coupling device. The coupling device may comprise a global positioning sensor or the like. In some aspects the coupling device may comprise a strain gauge of or the like that may hold and isolate sensor cables, wires and/or the like from the sensor deployed in the coupling device.

The coupling device may in some embodiments comprise an empty spike into which a sensor may be deployed, where the coupling device may be inserted into the soil by applying a vertical force on it or the like. In such embodiments, risk of damaging the sensor is considerably reduced compared to conventional sensor deployment. Additionally, in such embodiments, once the coupling device and sensor are deployed, the sensor can be replaced (for any reason) without changing the coupling, providing for repeatability of the sensor system.

In one embodiment, the coupling device is designed to comprise an outer-design including a thread configured to convert rotational motion to linear motion, such that the coupling device may be screwed into the soil. In other embodiments, drill-type configurations may be used to drill the coupling device into the soil.

Figure 5A:
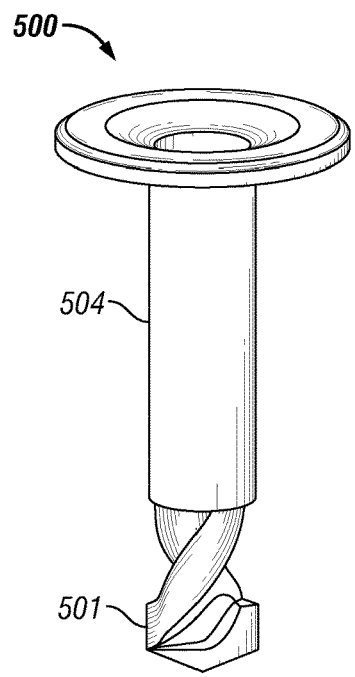
FIG. 5A illustrates sensors designed to be laid out on the ground (not planted), where stability is ensured by the bottom "plate", or tri-pod.
Figure 5B:
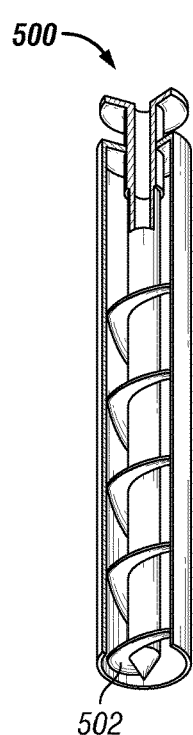
FIG. 5B illustrates sensors using spikes to be planted in the soil where multi-component sensor (3C) generally uses multiple spikes as shown in the sensor depicted on the right-hand-side.
Figure 5C:
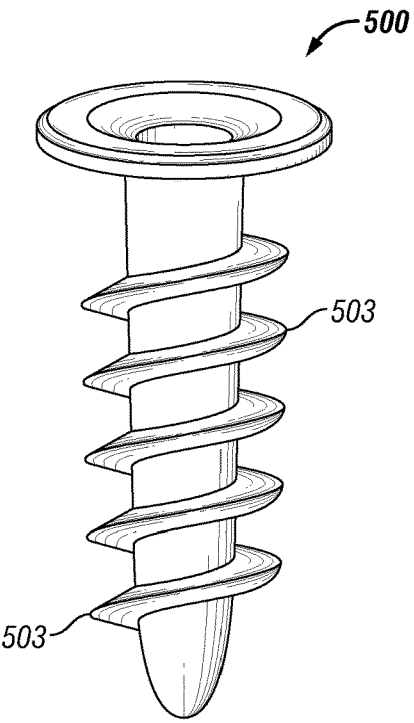
FIG. 5C illustrates sensors that are designed to be planted in the soil where the sensors are usually quite long and are difficult to plant in hard soil conditions.#

FIGS. 5A-C illustrate coupling device configurations using screwing-type and/or drilling-type mechanisms 500 for deployment of the coupling device 500, in accordance with embodiments of the present application, The illustrated embodiments may facilitate the planting/deployment of the coupling device 500 by providing means for drilling the coupling device into the ground. According to embodiments, as the screw coupling device is rotated, or the screw portion thereof, the screw digs into and promotes entrance into the ground, when pointed toward and force in the direction of the earth is applied. According to some designs, like in FIG. 5C, the design is a screw design, and the threads of the screw 503 may pull the coupling device into the ground by rotation. In other designs, like in 5A, the screw portion is more for boring/digging into the earth. Embodiments having combinations thereof are also envisioned, where the screw portion digs and pulls the coupling device into the earth when rotated.

FIG. 5A illustrates a coupling device arrangement comprising a drilling-type configuration having an empty drill bit 501 as the screw portion. In this configuration, the drill bit 501 may remain in place in the ground (the drill bit and the coupling device are an integrated system), or may be immediately removed from the coupling device 500 after planting the coupling device, as illustrated in FIG. 5. The drill bit 501 may comprise any shape and/or material, depending on the soil condition.

FIG. 65B illustrates an auger-type configuration for drilling the coupling device into the soil, the auger 502 being surrounded by the outer casing of the coupling device 500. The auger 502 can be removed from the coupling device once located in the earth.

FIG. 5C illustrates a screw-type configuration of the coupling device. With the screw-type design the coupling device 500 may be screwed into the soil and or screwed into a hole that was previously produced by a drilling type system. The parameters of the thread of the screw/drill 503—i.e., diameter, number, separation—may be varied in any of the illustrated systems depending on the soil/earth formation condition to provide for effective coupling of the coupling device to the soil/formation.

In the illustrated example, the coupling device 500 of FIG. 5A may provide simultaneous drilling and planting of the coupling device 500. As illustrated, first the ground is drilled, coupling device 500 acting as casing for the drilling process. After drilling, the drill bit 501 can be removed, leaving the outer housing 504 of the coupling device 500 in place. The sensor is then engaged with the outer housing 504 of the coupling device 500 that is drilled into the soil. In some embodiments, the coupling device 500 that is deployed in this manner may have an auger design, as shown in FIG. 5B.

Figure 6A:
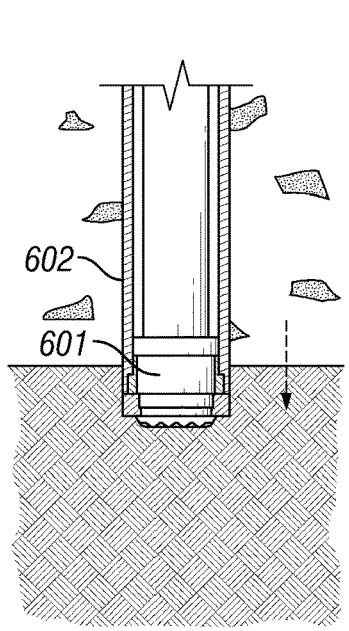
FIGS. 6A-C illustrate coupling device configuration using a screwing-type mechanism for deployment of the coupling device, in accordance with embodiments of the present application.
Figure 6B:
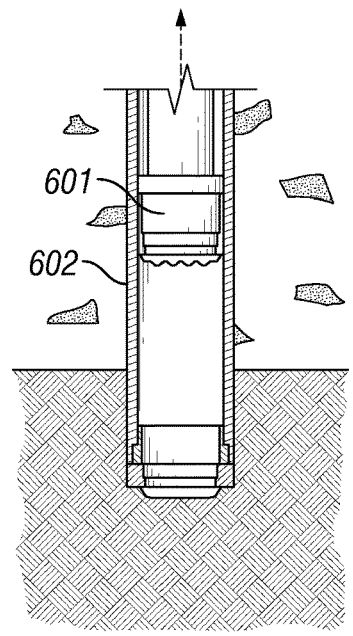
Figure 6C:
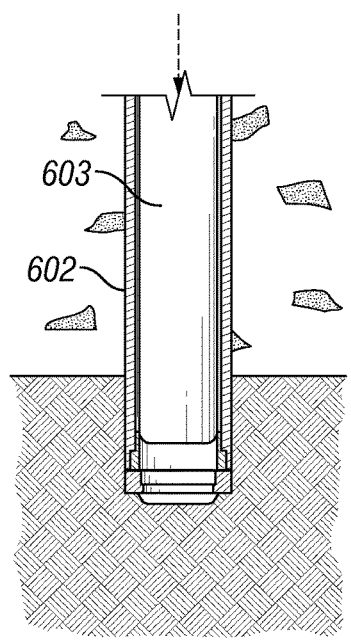

FIGS. 6A-6B illustrates various designs of a coupling device 600 in accordance with an embodiment of the present disclosure comprising a drill bit 601 or the like for drilling a hole in soil for deployment of the coupling device for a seismic survey. FIG. 6 shows the coupling device 600, including the drill bit 601 drilling/digging into the ground. A coupling housing or plug 602 is on the outer portion and surrounds the drilling bit 601. Once the coupling is in place, the drill bit 601 is removed, and the sensor 603 is placed inside the housing/plug 602, thereby establishing a connection with the ground so that the sensor 603 can detect seismic signals or reverberations that travel through the earth.

FIG. 7 illustrates a coupling device 700 comprising a screw-type design. In some embodiments, the coupling device 700 with a screw-type design may be screwed into the soil and the sensor 701 may then be inserted into the coupling device 700, which case include a plug portion 704. In some aspects, the coupling device 700 with a screw-type design may be screwed into a hole that has been previously drilled by a drilling system. The coupling device 700 can have screw threads 703 that when rotated promote movement and/or digging into the earth. In one embodiment, the coupling device 700 may be screwed into the ground with the sensor 701 already coupled with the coupling device 700. In some aspects, the coupling device 700 may be rotatable with respect to the sensor 701 to provide for screwing the coupling device 700 into the ground while the sensor 701 remains essentially stationary. In some aspects of the present disclosure, a chuck 702 or the like may be used to screw the coupling device into the ground. The screwing process may be done manually or with dedicated machines of high torque or the like.

In some embodiments, the coupling device may be made of bio-degradable material such that it can just be left in place in the ground. In other embodiments, the coupling device, depending on the outer design, may be unscrewed or simply extracted (upward force) from the ground. In other embodiments the coupling device may be left in place for future data acquisition, i.e., for reservoir and/or wellbore monitoring, 4D seismic surveying etc.). In some embodiments, the coupling device may comprise a lid or the like to protect the inner-design.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of seismic surveying, comprising:
placing at least partially into an earth surface, a seismic sensor coupling device that has a screw shape that when rotated digs into the earth, by rotating the coupling device;
after the seismic sensor coupling device has been rotated and placed at least partially into the earth surface, placing a seismic sensor system into the coupling device so that the seismic sensor is coupled to the coupling device so as to receive seismic signals reverberating through the earth subsurface, wherein the coupling device includes an inner design configured to generally match a shape of the seismic sensor system; wherein the sensor coupling device is rotatable with respect to the sensor to provide for screwing the sensor coupling device into the earth while the sensor remains essentially stationary;
actuating a seismic source to transmit impulses into the earth subsurface;
receiving, by the seismic sensor system, translational data in a first direction measured by particle motion sensors contained in an elongated housing of a seismic sensor device provided proximate the earth surface, the particle motion sensors spaced apart along a second, different direction along a longitudinal axis of the elongated housing, and receiving translational data in a third direction measured by additional particle motion sensors in the housing, the translational data in the first and third directions corresponding at least partially to the impulses; and
recording the translational data in the first direction and the translational data in the third direction, wherein a gradient of the translational data in the first direction with respect to the second direction is used to compute rotation data around the third direction, and wherein a gradient of the translational data in the third direction with respect to the second direction is used to compute rotation data around the first direction.

2. The method of claim 1, further comprising:
computing the rotation data around the third direction based at least in part on computing the gradient of the translational data in the first direction with respect to the second direction; and
computing the rotation data around the first direction based at least in part on computing the gradient of the translational data in the third direction with respect to the second direction.

3. The method of claim 1, further comprising placing the seismic sensor device into the earth surface using automatic placement equipment to drive the seismic sensor device into the earth surface.

4. The method of claim 1, wherein the seismic sensor device is without any particle motion sensors spaced apart along any direction different from the second direction.

5. The method of claim 1, wherein the particle motion sensors are spaced apart along the second direction by a distance that is less than a wavelength of a target signal for measurement by the sensor device.

6. The method of claim 1, wherein the particle motion sensors are spaced apart along the second direction by a distance that is less than or equal to about 0.3 times a wavelength of a target signal for measurement by the sensor device.

7. The method of claim 1, wherein the particle motion sensors are spaced apart along the second direction by a distance that is less than or equal to about 0.1 times a wavelength of a target signal for measurement by the sensor device.

8. The method of claim 1, wherein the second direction is a vertical direction, and wherein the first and third directions are horizontal directions, the first direction being orthogonal with respect to the third direction.

9. The method of claim 1, further comprising:
obtaining translational data in a second direction; and
computing divergence data based at least in part on computing a gradient of translational data in the second direction with respect to the second direction.

10. The method of claim 1, wherein receiving the translational data comprises receiving the translational data measured by the particle motion sensors provided on integrated circuit chips in the sensor device.

11. The method of claim 10, wherein the particle motion sensors include microelectromechanical systems (MEMS) sensors.

12. The method of claim 1, wherein one of the particle motion sensors is located below the earth surface and another one of the particle motion sensors is located above the earth surface.

13. The method of claim 1, wherein the particle motion sensors are below the earth surface.

14. A seismic sensor device comprising:
a sensor comprising an elongated housing having a longitudinal axis and one end that is adapted to be input into an earth to form a connection between the earth and the elongated housing so that seismic signals transmitted through the earth, including ground roll, will be transmitted to the elongated housing;
particle motion sensors within the elongated housing, a first of the particle motion sensors to measure translational data along three orthogonal axes and a second of the particle motion sensors to measure translational data along at least two orthogonal axes, the particle motion sensors configured so that the particle motion sensors are co-axial along one of the three axes and spaced apart from one another along the co-axial axis; and
a sensor coupling device that comprises a screw thread that when rotated digs and promotes the entrance of the coupling into earth, and has an inner compartment that is adapted to and contains the sensor so that when in the earth the sensor is coupled to the earth by way of the coupling device so as to receive seismic signals that travel through the earth, wherein the sensor coupling device includes an inner design configured to generally match a shape of the sensor and wherein the sensor coupling device is rotatable with respect to the sensor to provide for screwing the sensor coupling device into earth while the sensor remains essentially stationary.

15. The seismic sensor device of claim 14, further comprising:
a processor and a memory device in communication with the processor.

16. The seismic sensor device of claim 14, further comprising:
a power source in communication with the particle motion sensors.

17. The seismic sensor device of claim 14, wherein the elongated housing comprises a hollow tubular structure, wherein the particle motion sensors are located inside the hollow tubular structure.

18. The seismic sensor device of claim 17, wherein the hollow tubular structure includes protrusions in the form of a helical screw on an outside of the elongated housing.

19. The seismic sensor device of claim 17, wherein the hollow tubular structure includes protrusions on an outside of the hosing that form vertical fins that extend in the direction of the co-axial axis.

20. The seismic sensor device of claim 17, further comprising a processor, wherein the particle motion sensors are configured to detect translation in a direction of the co-axial axis, and in directions that are orthogonal to the co-axial axis, and to transmit data corresponding to the translation to the processor.

* * * * *